United States Patent

[11] 3,617,572

| [72] | Inventor | Daniel J. Monagle<br>Wilmington, Del. |
|---|---|---|
| [21] | Appl. No. | 873,672 |
| [22] | Filed | Nov. 3, 1969 |
| [45] | Patented | Nov. 2, 1971 |
| [73] | Assignee | Hercules Incorporated<br>Wilmington, Del. |

[54] FLOCCULATION AND SETTLING OF INORGANIC PARTICLES IN A SALT SOLUTION
4 Claims, No Drawings

[52] U.S. Cl.................................................. 210/54, 260/79.3
[51] Int. Cl.......................................................... B01d 21/01
[50] Field of Search............................................ 210/51–54

[56] References Cited
UNITED STATES PATENTS
3,493,500  2/1970  Volk et al. .................... 210/54

*Primary Examiner*—Reuben Friedman
*Assistant Examiner*—Thomas G. Wyse
*Attorney*—Lewis H. Wilson ABSTRACT: Predominantly inorganic water-insoluble particles suspended in aqueous salt solutions are flocculated and settled by adding to the solution a water-soluble copolymer of acrylamide and an alkali metal salt of vinyl sulfonic acid. Preferred copolymer is acrylamide—sodium vinyl sulfonate.

FLOCCULATION AND SETTLING OF INORGANIC PARTICLES IN A SALT SOLUTION

This invention relates to the separation of predominantly inorganic water-soluble suspended particles from aqueous salt solutions. In particular, it relates to such separation with certain water-soluble anionic polyelectrolyte polymers, preferably of high molecular weight. In a more specific embodiment, it relates to the separation of suspended particles from aqueous salt solutions employed in the treatment of water-soluble ores.

Water-soluble polyelectrolyte polymers based on acrylamide and/or acrylic acid are widely known and used for separating predominantly inorganic suspended particles from aqueous media. Most of these polyelectrolyte polymers, however, lose a significant amount of their effectiveness when used in the presence of salt solutions.

One area where this loss of effectiveness is a serious problem is in the refinement of water-soluble ores. Such ores, as mined, generally contain a significant amount of insoluble clay. This clay is removed by agitating the ore in a saturated salt solution and then decanting (desliming) the resultant clay suspension. The decanted liquid normally contains up to about 5 percent suspended clay solids which is allowed to settle out and the salt solution is returned to the system for reuse. To reduce the time required for such settling, a flocculant is added to the system.

In accordance with this invention, it has been found that a copolymer comprised of a major portion of acrylamide and a minor portion of an alkali metal or ammonium salt of vinyl sulfonic acid is an effective flocculant and settling aid for the separation of predominantly inorganic water-insoluble suspended particles from aqueous salt solutions. Specifically, copolymers containing about 85 to 98 percent by weight, and preferably 90 to 97 percent by weight of acrylamide and 15 to 2 percent by weight and preferably 10 to 3 percent by weight of the alkali metal salt of vinyl sulfonic acid having a reduced specific viscosity (RSV) of at least about 9, preferably at least about 12, have been found to promote rapid flocculation and settling of such suspended solid materials. The copolymer is preferably used in the amount of at least about 0.01 lb./ton of suspended material in the salt solution.

The preferred salt of vinyl sulfonic acid is the sodium salt. However, the potassium, lithium and ammonium salts are also useful.

In the following examples, where parts and percentages are by weight unless otherwise indicated, the invention is illustrated in several of its embodiments. The RSV referred to in the examples is measured on a 0.1 percent solution of the copolymer in a 0.2 molar aqueous $Na_2SO_4$ solution at 25° C.

EXAMPLE

POTASH ORE

A sample of sylvinite potash ore from the Carlsbad district of New Mexico was scrubbed in the conventional manner in the presence of a saturated KCl solution. Solids content of the ore-brine mixture was about 50 percent by weight. This was screened on a 30-mesh screen, to remove fines. The filtered brine contained about 1 percent by weight clay particles suspended therein.

Specimens of the brine-clay suspension were treated with varying amounts of a copolymer containing 95.5 percent acrylamide and 4.5 percent sodium vinyl sulfonate (SVS), having an RSV of 16.4. The specified amount of copolymer was added to a filtrate in a graduated 100 ml. cylinder and the mass was thoroughly agitated to assure complete mixing of clay and copolymer. The volume of supernatant liquid was noted at several time intervals and compared with a control containing no flocculant and with a commercially available poly(acrylamide) flocculant sold for this use under the trade name BENEFITE M-11. Results are recorded in table 1.

TABLE 1

| Flocculant | Conc. (lbs./ton/clay) | Volume of supernatant (ml.) at (min.)— | | | | |
|---|---|---|---|---|---|---|
| | | 1 | 2 | 3 | 5 | 10 |
| Benefite M-11 | 0.2 | 65 | 78 | 80 | 83 | 86 |
| Do | 0.4 | 72 | 79 | 81 | 84 | 86 |
| Example 1 | 0.1 | 4 | 40 | 80 | 83 | 86 |
| Do | 0.2 | 79 | 83 | 85 | 86 | 88 |
| Do | 0.4 | 80 | 84 | 85 | 86 | 88 |
| None (Control) | 0 | 0 | 0 | 0 | 50 | 82 |

EXAMPLE 2

BORAX ORE

Separation of clay from a borax ore solution was demonstrated by combining 579 parts of borax ore (70.23 percent sodium borate decahydrate, 3.83 percent $H_2O$ and 25.94 percent insoluble clay), 945 parts of sodium borate decahydrate and 1476 parts water at about 95° C. to form a solution containing about 5 percent suspended clay.

A copolymer of 4.5 percent SVS and 95.5 percent acrylamide (RSV 16.4) was mixed with several 100 cc. portions of the solution in graduated cylinders and the volume of supernatant liquid was measured at several time intervals. The test specimens were maintained at about 95° C. during testing. Test results are recorded in table 2 along with results where no flocculant was used and results using a commercially available acrylamide-based anionic flocculant sold for this use under the trade name SEPARAN MGL.

TABLE 2

| Flocculant | Lbs./ton | Volume of super (ml.) at (min.)— | | | |
|---|---|---|---|---|---|
| | | 2 | 4 | 11 | 30 |
| Example 2 | 0.05 | 28 | 59 | 72 | 78 |
| Do | 0.1 | 30 | 60 | 73 | 77 |
| Do | 0.2 | 40 | 62 | 74 | 75 |
| Do | 0.5 | 50 | 69 | 75 | 77 |
| Do | 1.0 | 50 | 63 | 76 | 78 |
| None (Control) | | | 30 | 55 | 63 |
| Separan MGL | 0.05 | 10 | 40 | 62 | 81 |
| Do | 0.1 | 15 | 45 | 62 | 81 |
| Do | 0.2 | 25 | 50 | 66 | 80 |
| Do | 0.5 | 45 | 60 | 69 | 79 |
| Do | 1.0 | 45 | 60 | 71 | 78 |

These results show that the SVS-Acrylamide copolymer is effective in flocculating the clay more quickly at lower concentrations than is the commercial flocculant.

EXAMPLE 3

A sample of sylvinite ore was scrubbed and filtered as described in example 1. The filtered brine recovered form this operation contained about 0.3 percent suspended, insoluble clay.

Specimens of this brine-clay suspension were treated with varying amounts of a copolymer containing about 89 percent acrylamide and 11 percent sodium vinyl sulfonate having an RSV of 9.5. Treatment was accomplished and the effectiveness of the copolymer as a flocculant was measured as described in example 1. Results are shown in table 3.

TABLE 3

| Flocculant | Conc. (lbs./ton/clay) | Supernatant volume (mil) at (min.)— | | | | | |
|---|---|---|---|---|---|---|---|
| | | 0.5 | 1 | 2 | 3 | 4 | 5 |
| Control (none) | 0 | 1 | 2 | 4 | 10 | 18 | 35 |
| Example 3 | 0.1 | 2 | 7 | 10 | 20 | 35 | 66 |
| Do | 0.2 | 3 | 12 | 50 | 83 | 85 | 87 |
| Do | 0.4 | 4 | 12 | 50 | 84 | 87 | 89 |

EXAMPLES 4 TO 11

To demonstrate the flocculating ability of the copolymers of this invention, a series of 5 percent dispersions of kaolin clay in salt solutions were prepared. To each of these there were added various concentrations of the 95.5/4.5 acrylamide-SVS copolymer of RSV 16.4. The flocculation rates of these mixtures are recorded in the following tables.

TABLE 4

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 4 | 5% sodium nitrate | 0 | 0 | 1 | 2 | 4 | 5 | 6 |
| | | 0.2 | 7 | 22 | 45 | 55 | 60 | 64 |
| | | 0.4 | 22 | 42 | 56 | 63 | 67 | 70 |
| | | 0.8 | 30 | 52 | 65 | 70 | 72 | 73 |

TABLE 5

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 5 | 2% calcium chloride | 0 | 0 | 1 | 2 | 3 | 5 | 6 |
| | | 0.2 | 6 | 19 | 42 | 52 | 58 | 65 |
| | | 0.4 | 9 | 27 | 49 | 57 | 62 | 61 |
| | | 0.8 | 19 | 40 | 57 | 64 | 68 | 71 |

TABLE 6

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 6 | 5% sodium acetate | 0 | 0 | 0 | 0 | 1 | 1 | 2 |
| | | 0.2 | 3 | 19 | 41 | 52 | 57 | 60 |
| | | 0.4 | 16 | 31 | 51 | 61 | 64 | 68 |
| | | 0.8 | 26 | 50 | 62 | 67 | 69 | 71 |

TABLE 7

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 7 | 2% sodium carbonate | 0 | 0 | 0 | 1 | 1 | 2 | 3 |
| | | 0.1 | 6 | 16 | 40 | 52 | 60 | 64 |
| | | 0.2 | 29 | 53 | 70 | 74 | 76 | 78 |
| | | 0.4 | 67 | 74 | 78 | 80 | 82 | 82 |
| | | 0.8 | 80 | 82 | 85 | 85 | 85 | 85 |

TABLE 8

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 8 | 5% disodium acid phosphate | 0 | 0 | 0 | 1 | 1 | 3 | 4 |
| | | 0.1 | 3 | 15 | 34 | 48 | 54 | 58 |
| | | 0.2 | 11 | 35 | 53 | 60 | 64 | 67 |
| | | 0.4 | 53 | 67 | 73 | 75 | 77 | 79 |

TABLE 9

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 9 | 1% sodium sulfate | 0 | 0 | 0 | 1 | 2 | 4 | 8 |
| | | 0.1 | 4 | 6 | 16 | 27 | 36 | 44 |
| | | 0.2 | 8 | 20 | 41 | 53 | 60 | 63 |
| | | 0.4 | 15 | 31 | 53 | 61 | 66 | 68 |
| | | 0.8 | 55 | 66 | 74 | 76 | 77 | 79 |

TABLE 10

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 10 | 2% sodium sulfate | 0 | 0 | 0 | 1 | 2 | 4 | 6 |
| | | 0.1 | 3 | 6 | 9 | 15 | 19 | 23 |
| | | 0.2 | 9 | 22 | 42 | 56 | 62 | 66 |
| | | 0.4 | 22 | 46 | 62 | 70 | 72 | 70 |
| | | 0.8 | 60 | 69 | 75 | 78 | 79 | 85 |

TABLE 11

| Ex. No. | Salt solution | Flocculant conc. (lbs./ton) | Supernatant volume (ml.) at (min.)— | | | | | |
|---|---|---|---|---|---|---|---|---|
| | | | 0.5 | 1 | 2 | 3 | 4 | 5 |
| 11 | 10% sodium sulfate | 0.1 | 0 | 0 | 2 | 3 | 3 | 6 |
| | | 0.2 | 3 | 7 | 15 | 25 | 35 | 40 |
| | | 0.4 | 2 | 11 | 35 | 49 | 55 | 58 |
| | | 0.8 | 20 | 42 | 60 | 65 | 69 | 71 |

EXAMPLE 12

A 50 percent aqueous slurry of uranium ore containing about 0.07% $U_2O_3$ was ball milled and leached for 44 hours with sulfuric acid at a pH of 1.5. The resulting uranium sulfate solution was diluted with water to reduce the insolubles content to 10 percent. This material was treated with the 95.5/4.5 copolymer and the settling rates are recorded in table 12.

TABLE 12

| Ex. No. | Flocculant conc. (lbs./ton) | Supernatant volume (ml.) at (min.)— | | | | | |
|---|---|---|---|---|---|---|---|
| | | 0.5 | 1 | 2 | 3 | 4 | 5 |
| 12 | 0 | 0 | 1 | 2 | 2 | 3 | 4 |
| | 0.2 | 3 | 5 | 14 | 26 | 36 | 42 |
| | 0.4 | 7 | 15 | 33 | 43 | 52 | 55 |
| | 0.8 | 68 | 73 | 74 | 75 | 75 | 75 |

EXAMPLE 13

A 50 percent aqueous slurry of copper ore containing about 2.2 percent copper silicate was ball milled and leached with sulfuric acid at a pH of 1.6 for 2 hours. The resulting copper sulfate solution was diluted with water to reduce the solids content to 20 percent. This material was treated with various amounts of the 95.5/4.5 copolymer and the settling rates are recorded in table 13.

TABLE 13

| Ex. No. | Flocculant conc. (lbs./ton) | Supernatant volume (ml.) at (min.)— | | | | | |
|---|---|---|---|---|---|---|---|
| | | 0.5 | 1 | 2 | 3 | 4 | 5 |
| 13 | 0 | 0 | 0 | 1 | 1 | 2 | 3 |
| | 0.6 | 4 | 5 | 11 | 21 | 28 | 36 |
| | 0.8 | 31 | 40 | 48 | 51 | 52 | 54 |
| | 1.0 | 41 | 47 | 50 | 53 | 54 | 55 |

The alkali metal vinyl sulfonate—acrylamide copolymer employed in this invention must have a relatively high molecular weight in order to realize the best performance. Viscosity measurement is the only really practical and meaningful way known for measuring the molecular weight of copolymers having the high molecular weights of those employed in this invention, and this method is widely used and accepted. Thus the useful copolymers according to this invention are those having an RSV of at least about 9 measured on a 0.1 percent solution of the copolymer in a 0.2 molar aqueous $Na_2SO_4$ solution at 25° C. Preferably, the RSV will be at least about 12. Copolymers useful in the process of this invention can be prepared by known methods, e.g., by the methods taught in U.S. Pat. Nos. 3,336,269 or 3,336,270.

What I claim and desire to protect by Letters Patent is:

1. A process for flocculating and settling predominantly inorganic water-insoluble suspended particles from an aqueous salt solution which comprises adding to said salt solution a water-soluble copolymer consisting essentially of acrylamide and an alkali metal or ammonium salt of vinyl sulfonic acid.

2. The process of claim 1 where the vinyl sulfonic acid salt is sodium vinyl sulfonate.

3. A process for separating suspended insoluble inorganic particles from an aqueous salt solution which comprises adding to said salt solution per ton of suspended particles at least about 0.01 lb. of a water-soluble copolymer consisting essentially of about 85 to 98 percent acrylamide by weight and about 15 to 2 percent by weight of a salt of vinyl sulfonic acid selected from the class consisting of alkali metal and ammonium salts, said copolymer having an RSV of at least about 9 measured in a 0.1 percent solution in 0.2 M sodium sulfate at 25° C.

4. The process of claim 3 where the vinyl sulfonic acid salt is sodium vinyl sulfonate.

* * * * *